United States Patent
Dotz

(10) Patent No.: US 11,489,388 B2
(45) Date of Patent: Nov. 1, 2022

(54) STATOR WITH PINS FOR AN ELECTRIC MACHINE

(71) Applicant: VALEO SIEMENS EAUTOMOTIVE GERMANY GMBH, Erlangen (DE)

(72) Inventor: Boris Dotz, Munich (DE)

(73) Assignee: VALEO SIEMENS EAUTOMOTIVE GERMANY GMBH, Erlangen (DE)

(*) Notice: Subject to any disclaimer, the term of this patent is extended or adjusted under 35 U.S.C. 154(b) by 204 days.

(21) Appl. No.: 17/101,475

(22) Filed: Nov. 23, 2020

(65) Prior Publication Data
US 2021/0159749 A1 May 27, 2021

(30) Foreign Application Priority Data
Nov. 26, 2019 (DE) .................... 10 2019 131 973.0

(51) Int. Cl.
*H02K 3/28* (2006.01)
*B60K 1/00* (2006.01)

(52) U.S. Cl.
CPC . *H02K 3/28* (2013.01); *B60K 1/00* (2013.01)

(58) Field of Classification Search
CPC .. H02K 3/00; H02K 3/04; H02K 3/12; H02K 3/14; H02K 3/28; H02K 3/48; H02K 3/50; H02K 3/505
See application file for complete search history.

(56) References Cited

U.S. PATENT DOCUMENTS

| | | | |
|---|---|---|---|
| 6,894,417 B2 * | 5/2005 | Cai | H02K 3/28 310/201 |
| 9,136,738 B2 | 9/2015 | Ikeda et al. | |
| 2003/0230949 A1 | 12/2003 | Ogawa et al. | |
| 2008/0042508 A1 | 2/2008 | Cai | |
| 2009/0267441 A1 | 10/2009 | Hiramatsu et al. | |
| 2014/0319953 A1 * | 10/2014 | Rahman | H02K 3/04 310/201 |
| 2021/0175765 A1 * | 6/2021 | Dotz | H02K 3/12 |

FOREIGN PATENT DOCUMENTS

| | | |
|---|---|---|
| DE | 103 26 095 A1 | 4/2004 |
| DE | 11 2007 001 411 T5 | 4/2009 |
| JP | 2014-036493 A | 2/2014 |

* cited by examiner

*Primary Examiner* — Tran N Nguyen
(74) *Attorney, Agent, or Firm* — Manabu Kanesaka

(57) ABSTRACT

A stator for an electric machine includes a plurality of pins arranged on concentric circles at different distances to a stator center in slots, and each concentric circle forms a layer. In each case, four pins in different layers are serially connected to one another and form a winding. A first pin of the winding is located in a first slot in the 4n–1 layer, wherein n is an integer. A second pin of the winding is located in a second slot in the 4n layer, wherein the second slot has a first radial distance to the first slot in a first circumferential direction of the stator. A third pin of the winding is located in a third slot in the 4n–2 layer, wherein the third slot lies adjacent to the first slot. A fourth pin of the winding is located in a fourth slot in the 4n–3 layer.

11 Claims, 14 Drawing Sheets

STATOR WITH PINS FOR AN ELECTRIC MACHINE

The invention relates to a stator with pins for an electric machine, in particular an electric motor.

RELATED APPLICATIONS

The present application is based on, and claims priority from, German Application No. DE 10 2019 131 973.0 filed Nov. 26, 2019, the disclosure of which is hereby incorporated by reference herein in its entirety.

BACKGROUND INFORMATION

Electric machines are generally known and are increasingly used as electric motors for driving vehicles. An electric machine consists of a stator and a rotor.

The stator comprises a plurality of slots, in which the windings are guided. The windings may be formed as so-called pins made from insulated copper rods. The rotor is located in the stator and is connected to a rotor shaft.

Such a pin, U pin, or hairpin motor is known, for example, from U.S. Pat. No. 9,136,738 B2.

BRIEF DESCRIPTION OF THE INVENTION

The object of the present invention is to provide a stator with windings made from pins, which is easy to manufacture.

According to the invention a stator for an electric machine comprises a plurality of pins, which are arranged on concentric circles at different distances to a stator center in slots in the stator, and each concentric circle forms a layer, wherein in each case four pins in different layers are serially connected to one another and form a winding, a first pin of the winding is located in a first slot in the 4n−1 layer, wherein n is an integer, a second pin of the winding is located in a second slot in the 4n layer, wherein the second slot has a first radial distance to the first slot in a first circumferential direction of the stator, a third pin of the winding is located in a third slot in the 4n−2 layer, wherein the third slot lies adjacent to the first slot, a fourth pin of the winding is located in a fourth slot in the 4n−3 layer, wherein the fourth slot lies adjacent to the second slot.

The layers may be numbered in ascending order from the outside inward to the stator center. The integers do not include zero.

A stator with the winding according to the invention may be easily produced and generates an efficient electromagnetic field with lower iron or magnetic losses, and a better utilization of the steel sheet stacks. The connection types establish an electrically conductive connection between the pins in the slots. The connection type may be a welding of conductors to the pins, or the pins may already be designed as double pins, so-called U pins, and thus already establish a connection upon insertion into the stator. Furthermore, a bonding of end sections of the pins bent toward one another also represents a connection type.

The third and fourth slot preferably lie on a same adjacent side of the first and second slots in the circumferential direction.

The rotating field generated by such a winding has fewer disturbing harmonics and thus has fewer torque ripples and smaller torque fluctuations, and also better NVH properties.

A first distance may additionally preferably lie between the first slot and the second slot and between the third and the fourth slot, and a second distance may lie between the third and the second slots, and the second distance may be smaller than the first distance.

A stator with windings distributed on slots with different distances has lower AC ohmic losses and a lower saturation.

In one embodiment of the invention, the stator may have a first and a second end face, and the first and second pins may be connected to one another on the second end face by means of a first connection type, the second pin and the third pin may be connected to one another on the first end face by means of a second connection type, the third pin and the fourth pin may be connected to one another on the second end face by means of a third connection type, wherein the first, second, and third connection types differ from one another.

The different connection types enable an improved manufacturing. An alternating location of the connection types on different end faces enables the efficient formation of a winding about the stator teeth lying between the slots.

Even connection types on the same end face of the stator may differ due to different bending directions of a pin foot toward the stator interior or exterior.

A combination of the previously listed connection types on different or the same end face of the stator is also possible. A simple and fast manufacturing is possible due to one same connection type on the same end faces, and different connection types on different end faces of the stator. For example, the connection is established by a type of pre-bent pins, so-called double pins or also U pins on one end face, and pins are welded to one another individually or one side of the double pin in each case is welded on another end face of the stator. The weld spots may contact the feet of the pins or double pins.

The stator may preferably have at least two windings, and at least the fourth pin in the fourth slot is connected to a fifth pin in the 4n−1 layer in a fifth slot by means of a fourth connection type.

Additionally preferably, the stator may have a plurality of windings, which extend across the entire circumference of the stator and thereby form a partial coil.

The windings thus have a symmetry which generates a uniform rotating field.

In another embodiment, one pin in each case from two partial coils may be connected to one another by means of a fifth connection type or a sixth connection type and form a coil.

These pins may be so-called end pins, which mark the end of a partial coil.

The partial coils may preferably form six coils, and these may be assigned to three phases in such a way that in each case, two coils, which are assigned to a same phase, may be located in three adjacent slots and thereby in each case two layers of the two outer slots may be occupied by pins from other phases.

One input from at least two coils may additionally preferably be connected to one another by means of a seventh connection type.

The seventh connection type may be established by a conductor applied to the pins or by a conducting ring.

In one preferred embodiment of the invention, one output of at least two coils may be connected to one another, and the two coils may thus be switched in parallel and may, in particular, be assigned to one phase.

The two coils may be connected in parallel and may additionally be supplied by a same phase. The parallel connection may be carried out by the paired connection of one first and one fifth end pin or of one fourth and one eighth end pin.

Furthermore, two phases may respectively have an approximately identical current and voltage curve, and thus a six-phase inverter may only control a three-phase motor. A current division of the switching elements is possible in the inverter using this arrangement.

Two coils in the same slots may thus be switched in parallel and supplied by one phase, so that a stator results with windings for a three-phase electric machine.

According to the invention, a vehicle has an electric machine with a stator according to one of the preferred embodiments.

DESCRIPTION OF THE DRAWINGS

FIG. 1 shows a stator 1 with a plurality of slots 5 in which pins 2, 3 are guided. Stator 1 has a first end face 7 and a second end face 9 lying opposite. Inputs 81, 87, 101, 107, 111, 117 and outputs 83, 85, 103, 105, 113, 115 of partial coils for connecting the pins to an energy source for operating the electric machine are shown on first end face 7. Naturally, a rotor is additionally necessary to operate an electric machine. The pins for the connection lie closely adjacent and enable short connecting lines.

FIG. 2 shows a stator 1 with slots and pins on four layers, wherein only eight slots 51, 52, 53, 54, 55, 56, 57, 58 are depicted. Pins 21, 22 are arranged in the slots. The pins lie adjacent to one another in a slot; in the example of FIG. 2, there is space for four pins adjacent to one another in a slot. The four pins within one slot thus lie on different concentric circles L1, L2, L3, L4 around center M of the stator, which thus form individual layers. A first distance 11 lies between each two slots. This first distance 11 is identical between all slots shown in FIG. 2.

FIG. 3 shows stator 1 from FIG. 2. The pins are, moreover, arranged on concentric circles, thus layers, wherein the concentric circles are not marked for the sake of a better depiction. FIG. 3 depicts which pins are serially connected to one another. A first pin 21, which is also simultaneously an end pin, is located in a first slot 51 in layer L3. This first pin 21 is connected to a second pin 22 in a second slot 58 by means of a first connection type 61, depicted as a solid line. Second pin 22 is located in layer L4. Second pin 22 is connected to a third pin 23 in a third slot 91 by means of a second connection type 62, depicted as a short dashed line. Third slot 91 lies radially adjacent to first slot 51 and between first slot 51 and second slot 58. Third pin 23 lies in layer L2.

Figure 1:
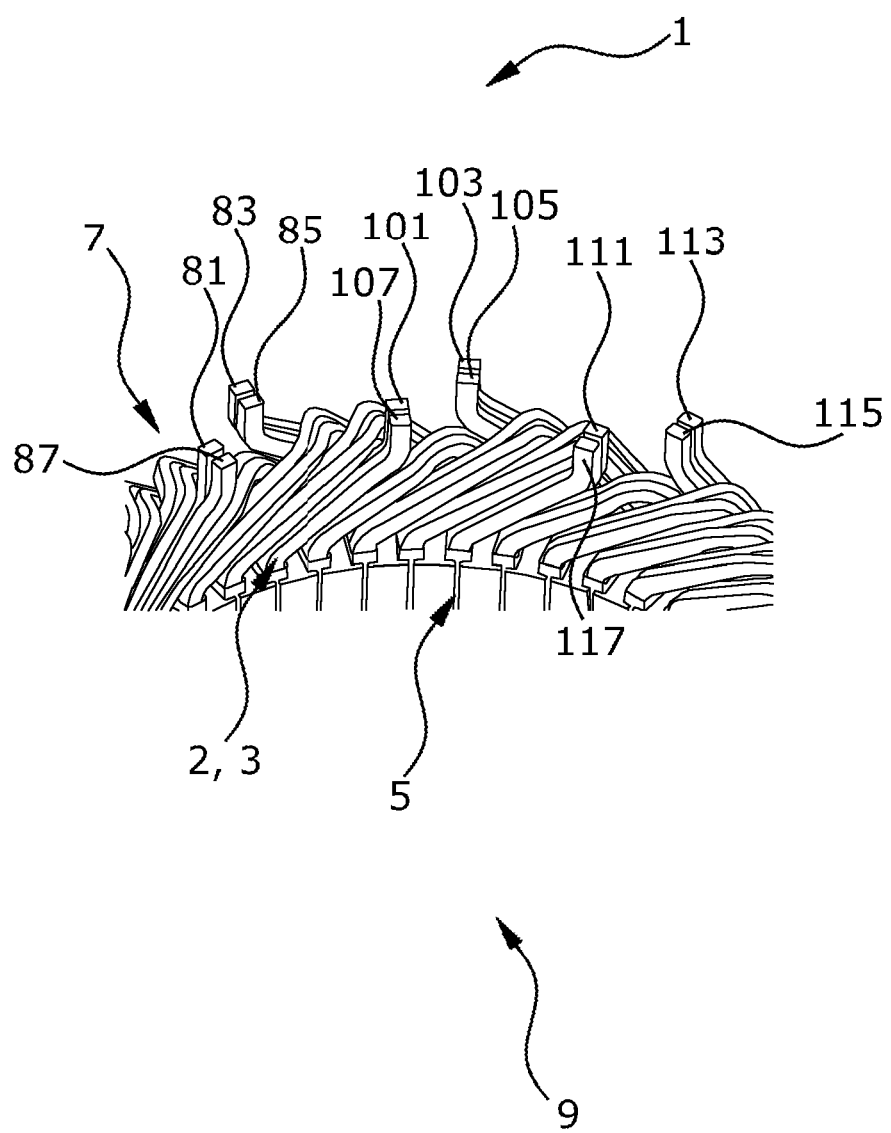
FIG. 1 shows a stator.
Figure 2:
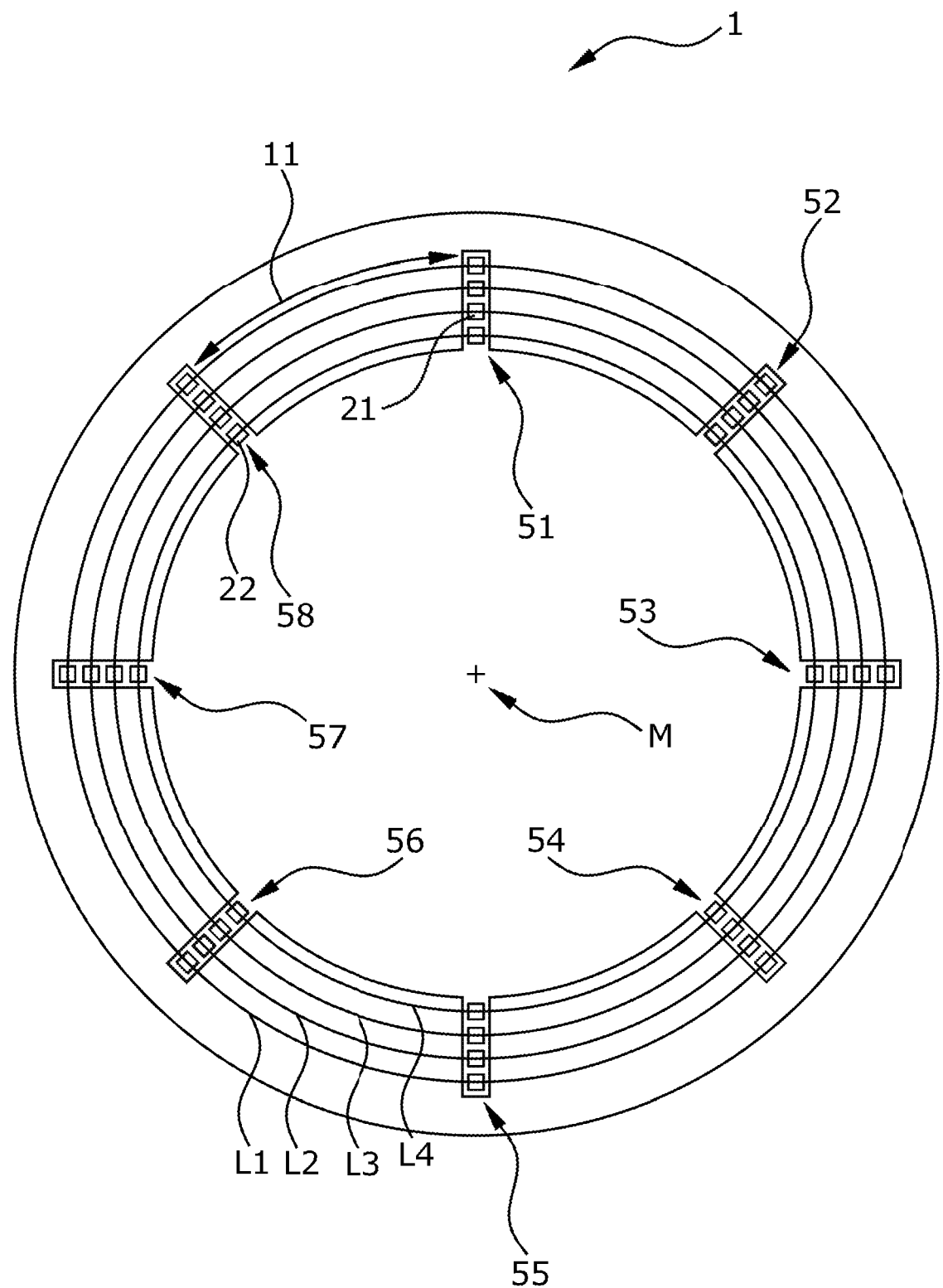
FIG. 2 shows a stator with eight slots and four layers.

Third slot 91 has a second distance 13 from second slot 58. Second distance 13 is one slot shorter than first distance 11 from the previous figure.

It is clear for the person skilled in the art that the different distances always relate to the same layer. The distance between two slots on, for example, layer 4 is naturally smaller than on layer 1, as the radius of layer 4 is smaller than that of layer 1.

Third pin 23 is connected to a fourth pin 24 via a third connection type 63, depicted as a dotted line. Fourth pin 24 lies in a fourth slot 98. Fourth slot 98 lies radially adjacent to second slot 58 and between second slot 58 and a fifth slot 57. Fourth pin 24 lies in layer L1.

The connection of the first, second, third, and fourth pins forms a first winding 41.

Fourth pin 24 is connected to a fifth pin 25 in fifth slot 57 by means of a fourth connection type 64, depicted as a dashed line. Fifth pin 25 lies in layer L3. At fifth pin 25, the previously-described serial connection of the consecutive pins in the stator begins again, wherein fifth pin 25 is similar to first pin 21 with an offset of the slot by 90 degrees. In contrast to first pin 21, fifth pin 25 is not an end pin, as it is connected to two other pins, whereas first end pin 21 has only one connection to a pin, thus to second pin 22.

The serial connection of fifth pin 25 to other pins in three other slots 56, 97, and 96 forms a second winding 42. The first, second, and third connection types 61, 62, 63 between these pins is identical to the respective first, second, third connection types 61, 62, 63 of the pins of the first winding 41.

The two windings 41, 42 are connected by fourth connection type 64. Due to the continuation of the serial connection, third winding 43 and fourth winding 44 are formed in four additional slots 55, 54, 95, and 94, and also 53, 52, 93, 92. Windings 41, 42, 43, 44 are each connected with fourth connection type 64. Fourth connection type 64 between the respective windings is thus identical. The first, second, and third connection types 61, 62, 63 between the pins of windings 43, 44 are also identical to the first, second, third connection types 61, 62, 63 of the first and second windings 41, 42.

Four windings 41, 42, 43, 44 form a first partial coil by way of one circuit counter-clockwise about stator 1. First pin 21 additionally has an input 81 for connecting to an energy source. First pin 21 of winding 41 thus represents a first end pin. The partial coil ends with pin 28 in layer L1 of winding 44. Last pin 28 of winding 44 thus represents a second end pin.

Figure 4:
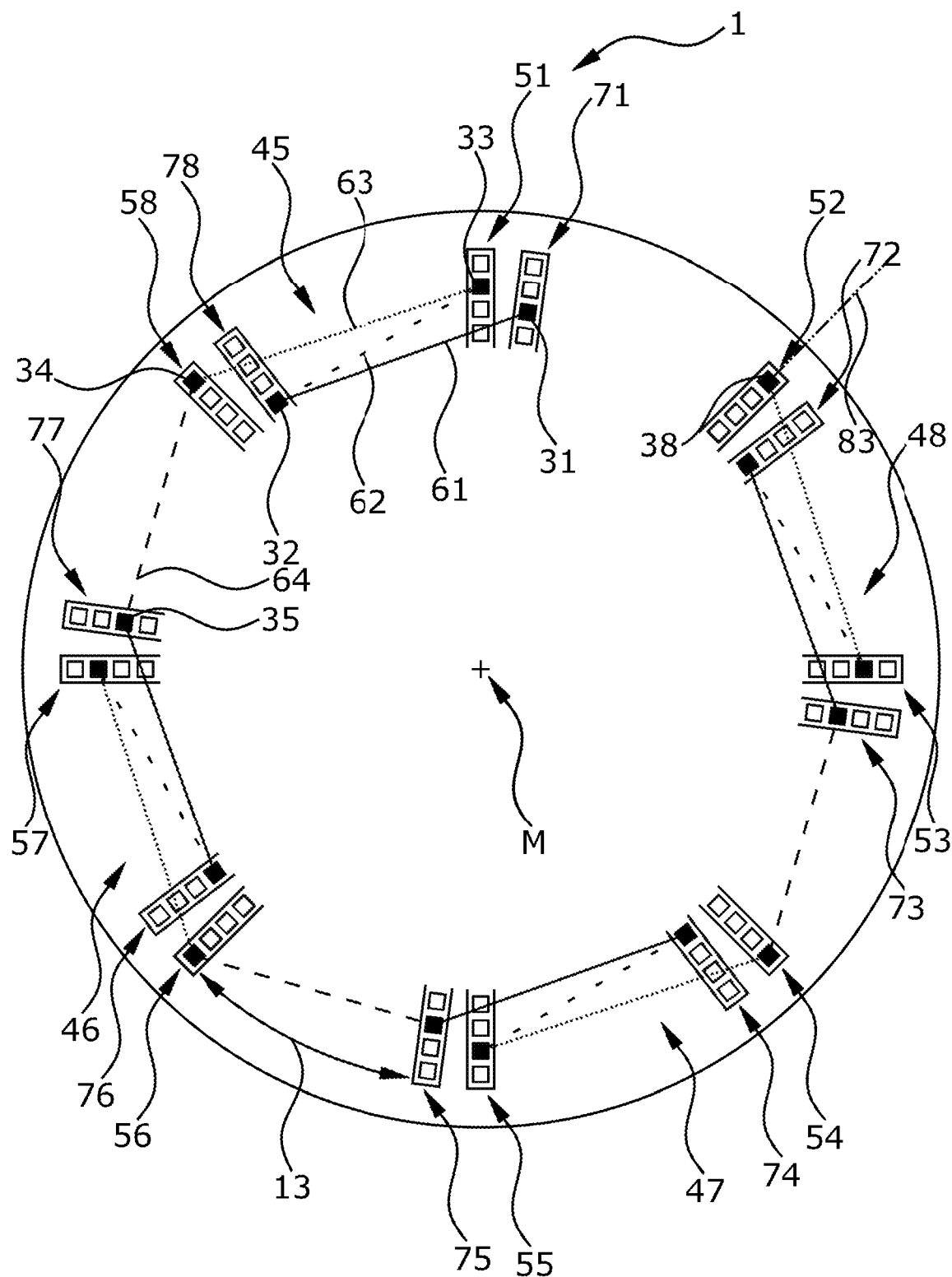
FIG. 4 shows a winding scheme of a second partial coil.

FIG. 4 shows a stator 1, wherein eight other slots 71, 72, 73, 74, 75, 76, 77, 78 are shown.

Figure 3:
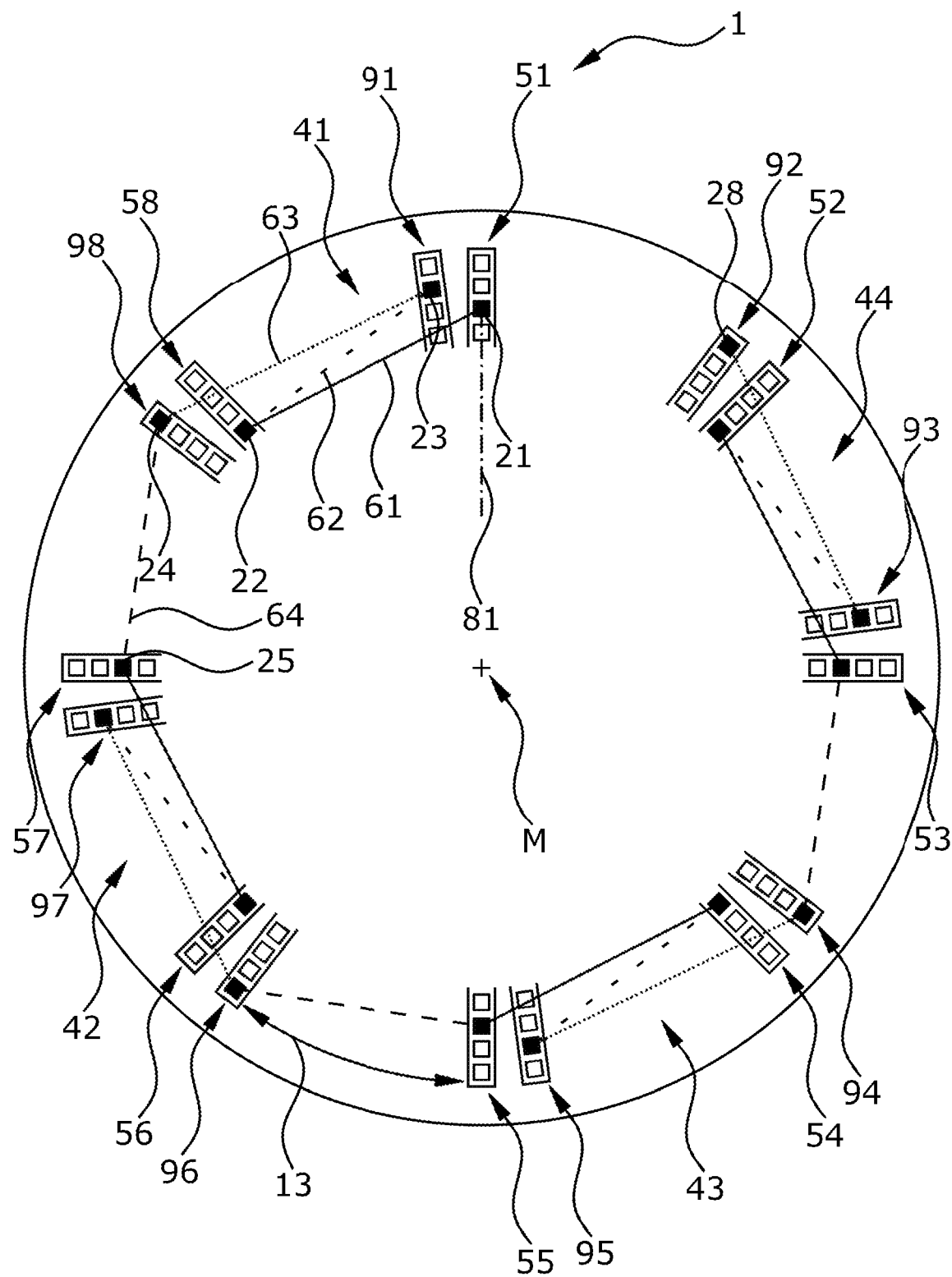
FIG. 3 shows a winding scheme of a first partial coil.

Pins 31, 32, 33, 34, 35, 38 are connected in the same way as pins 21, 22, 23, 24, 25, 28 of FIG. 3. Even the connection types are identical with FIG. 3 and are highlighted by identical reference numerals and line depictions. Windings 45, 46, 47, 48 are formed in the same way as is described in FIG. 3, and connected counter clockwise to one another by fourth connection type 64.

Four windings 45, 46, 47, 48 form a second partial coil by way of one circuit counter-clockwise about stator 1. The partial coil begins with a first pin 31, which is a third end pin. The partial coil ends with pin 38 of winding 48. Last pin 38 of winding 48 in layer L1 thus represents a fourth end pin.

Fourth end pin 38 additionally has an output 83 for connecting to an energy source. Input 81 and output 83 may naturally also be reversed.

Figure 5:
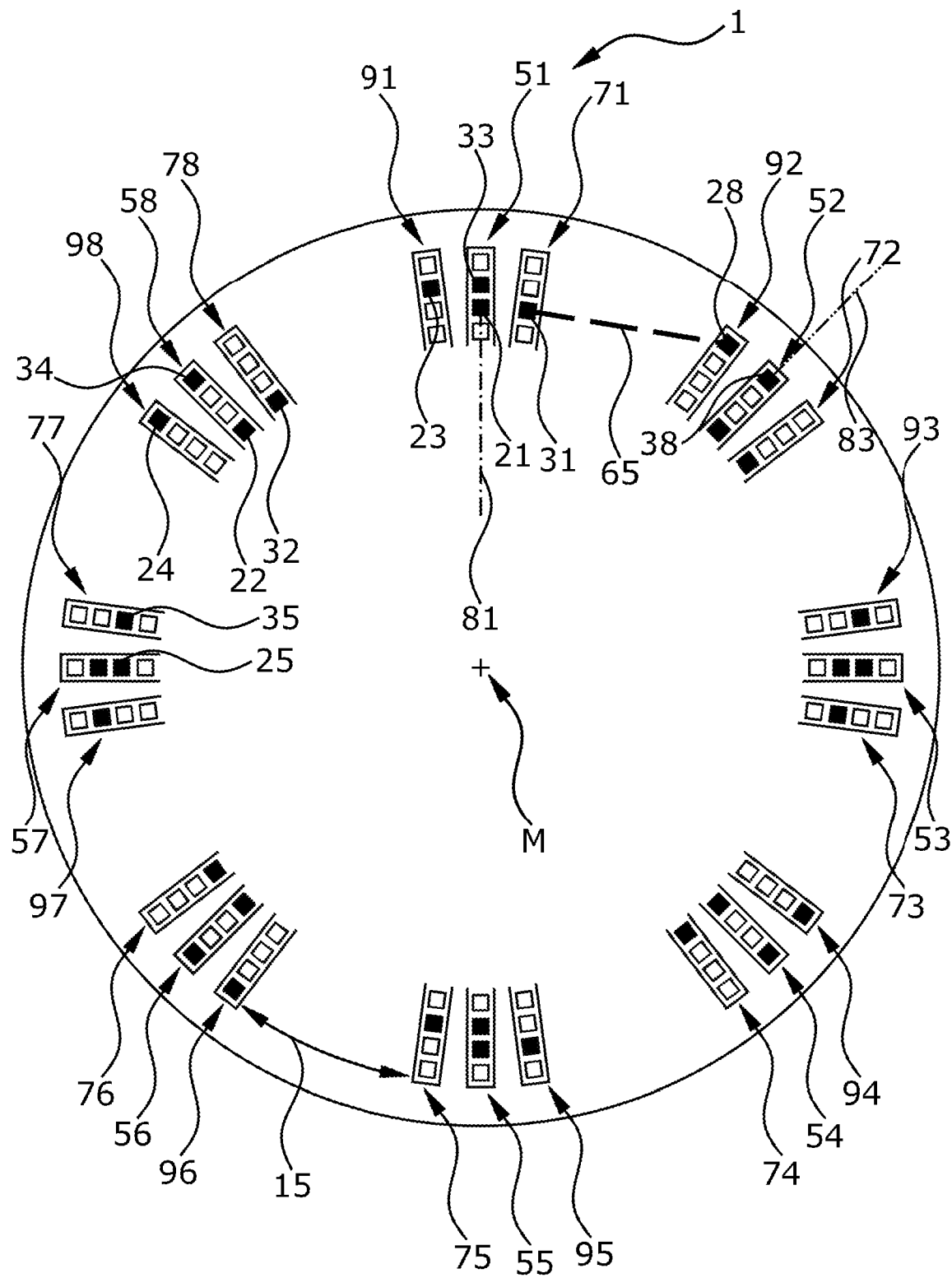
FIG. 5 shows a stator with a first and a second partial coils and their connection to one another and thus a first coil.

FIG. 5 shows a pin assignment by the first and second partial coils from FIGS. 3 and 4, which are represented by black squares. Identical references numerals designate identical pins, slots, connections in the figures. Sixth pin 28 of fourth winding 44 of the first partial coil in slot 92, layer L1, which is also a second end pin, and first pin 31 of first winding 45 of the second partial coil in slot 71, layer L3, which is also a third end pin, are connected by a fifth connection type 65.

The two partial coils thus form a first coil 201 with an input 81 and an output 83 after two radial circuits counter clockwise about the stator. A third distance 15, depicted in the figure, is two slots shorter than first distance 11 and one slot shorter than second distance 13 from the previous figures.

Figure 6:
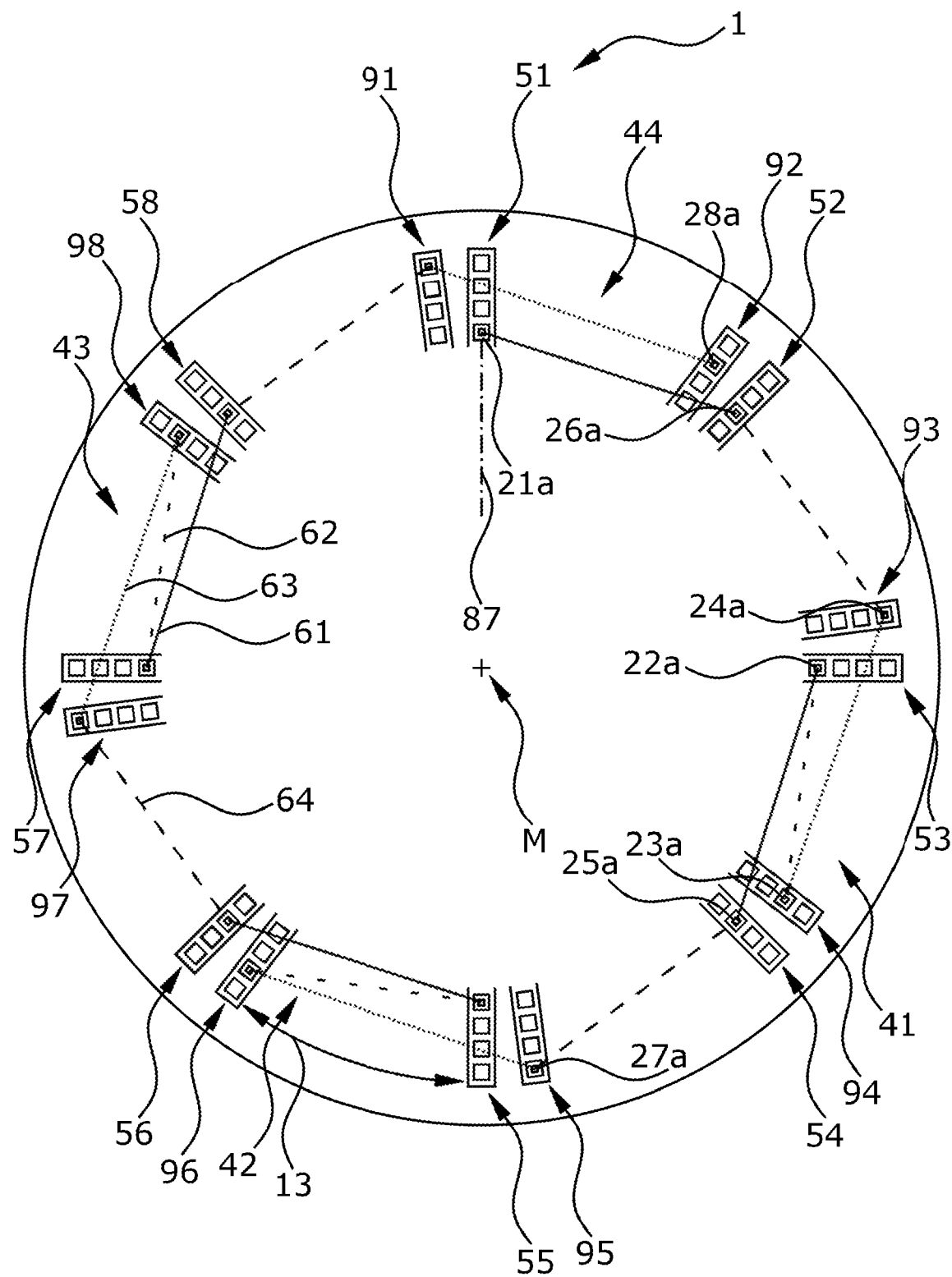
FIG. 6 shows a winding scheme of another partial coil.

FIG. 6 shows a stator 1. The pins are, moreover, arranged on concentric circles, thus layers, wherein the concentric circles are not marked for the sake of a better depiction. It depicts which pins, depicted as black squares on a white background, are serially connected to one another and form a first partial coil of a second coil 202. A fifth end pin 21a is located in first slot 51 in layer L4. Fifth end pin 21a additionally has an input 87 for connecting to an energy source. Fifth end pin 21a is connected to a sixth pin 26a in slot 52 by means of first connection type 61. Sixth pin 26a is located in layer L3. Sixth pin 26a is connected to a fourth pin 24a in layer L1 in slot 93 by means of fourth connection type 64.

Fourth pin 24a is connected to a third pin 23a via a third connection type 63, depicted as a dotted line. Third pin 23a lies in a slot 94. Slot 94 lies radially adjacent to slot 54 and between slot 53 and slot 54. Third pin 23a lies in layer L2.

Third pin 23a is connected to a second pin 22a via a second connection type 62, depicted as a short dashed line. Second pin 22a lies in slot 53. Slot 53 lies radially adjacent to slot 93 and between slot 93 and slot 94. Second pin 22a lies in layer L4.

Second pin 22a is connected to a fifth pin 25a via a first connection type 61, depicted as a solid line. Fifth pin 25a lies in slot 54. Slot 54 lies radially adjacent to slot 94 and between slot 94 and slot 95. Fifth pin 25a lies in layer L3. The serial connection of the first, second, third, and fourth pins 25a, 22a, 23a, 24a forms a first winding 41.

Fifth pin 25a is connected to a seventh pin 27a via a fourth connection type 64, depicted as a dashed line. Seventh pin 27a lies in slot 95. Slot 95 lies radially adjacent to slot 55 and between slot 55 and slot 54. Seventh pin 27a lies in layer L1. At seventh pin 27a, the previously-described serial connection of the consecutive pins in the stator begins again, wherein seventh pin 27a is similar to fourth pin 24a with an offset of the slot by 90 degrees.

The serial connection of seventh pin 27a to other pins in three other slots 96, 55, and 56 forms a second winding 42. The first, second, and third connection types 61, 62, 63 between these pins is identical to the respective first, second, third connection types 61, 62, 63 of the pins of the first winding 41.

The two windings 41, 42 are connected by fourth connection type 64. Due to the continuation of the serial connection, a third winding 43 is formed in four other slots 97, 98, 57, and 58.

A fourth winding 44 depicts a distinctive feature, as it has no second connection type. Winding 44 is formed by a sixth connection type 66, which is described in connection with FIG. 8 and shown there. The sixth connection type connects a sixth end pin 28a of the first partial coil with a seventh end pin 31a, which is shown in FIG. 7.

Figure 7:
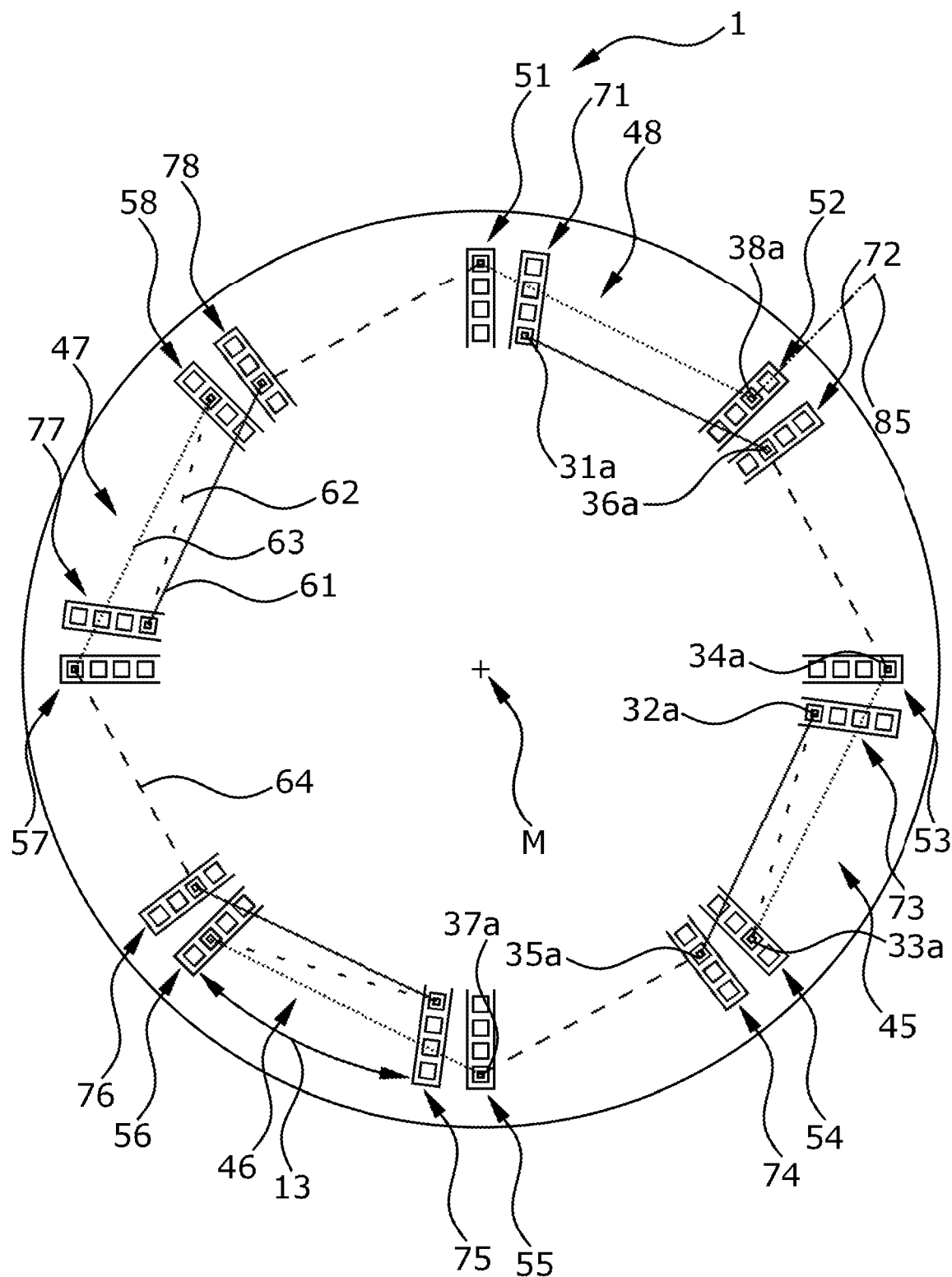
FIG. 7 shows a winding scheme of another partial coil.

FIG. 7 shows a stator 1, wherein eight other slots 71, 72, 73, 74, 75, 76, 77, 78 are shown.

The pins are, moreover, arranged on concentric circles, thus layers, wherein the concentric circles are not marked for the sake of a better depiction. It depicts which pins, depicted as black squares on a white background, are serially connected to one another and form a second partial coil of a second coil 202. A seventh end pin 31a is located in slot 71 in layer L4. This seventh end pin 31a is connected to a sixth pin 36a in slot 72 by means of first connection type 61. Sixth pin 36a is located in layer L3. Sixth pin 36a is connected to a fourth pin 34a in layer L1 in slot 53 by means of fourth connection type 64.

Fourth pin 34a is connected to a third pin 33a via a third connection type 63, depicted as a dotted line. Third pin 33a lies in a slot 54. Slot 54 lies radially adjacent to slot 74 and between slot 74 and slot 73. Third pin 33a lies in layer L2.

Third pin 33a is connected to a second pin 32a via a second connection type 62, depicted as a short dashed line. Second pin 32a lies in slot 73. Slot 73 lies radially adjacent to slot 53 and between slot 53 and slot 54. Second pin 32a lies in layer L4.

Second pin 32a is connected to a fifth pin 35a via a first connection type 61, depicted as a solid line. Fifth pin 35a lies in slot 74. Slot 74 lies radially adjacent to slot 54 and between slot 54 and slot 55. Fifth pin 35a lies in layer L3. The connection of the first, second, third, and fourth pins forms a first winding 45.

Fifth pin 35a is connected to a seventh pin 37a via a fourth connection type 64, depicted as a dashed line. Seventh pin 37a lies in slot 55. Slot 55 lies radially adjacent to slot 75 and between slot 75 and slot 74. Seventh pin 37a lies in layer L1. At seventh pin 37a, the previously-described serial connection of the consecutive pins in the stator begins again, wherein seventh pin 37a is similar to fourth pin 34a with an offset of the slot by 90 degrees.

The serial connection of seventh pin 37a to other pins in three other slots 56, 75, and 76 forms a second winding 46. The first, second, and third connection types 61, 62, 63 between these pins is identical to the respective first, second, third connection types 61, 62, 63 of the pins of the first winding 45.

The two windings 45, 46 are connected by fourth connection type 64. Due to the continuation of the serial connection, a third winding 47 is formed in four other slots 57, 58, 77, and 78. Fourth winding 48 depicts a distinctive feature, as it has no second connection type. This winding 48 is formed by a sixth connection type 66, which is described in connection with FIG. 8 and shown there.

Eighth end pin 38a additionally has an output 85 for connecting to an energy source. Input 87 and output 85 may naturally also be reversed.

Figure 8:
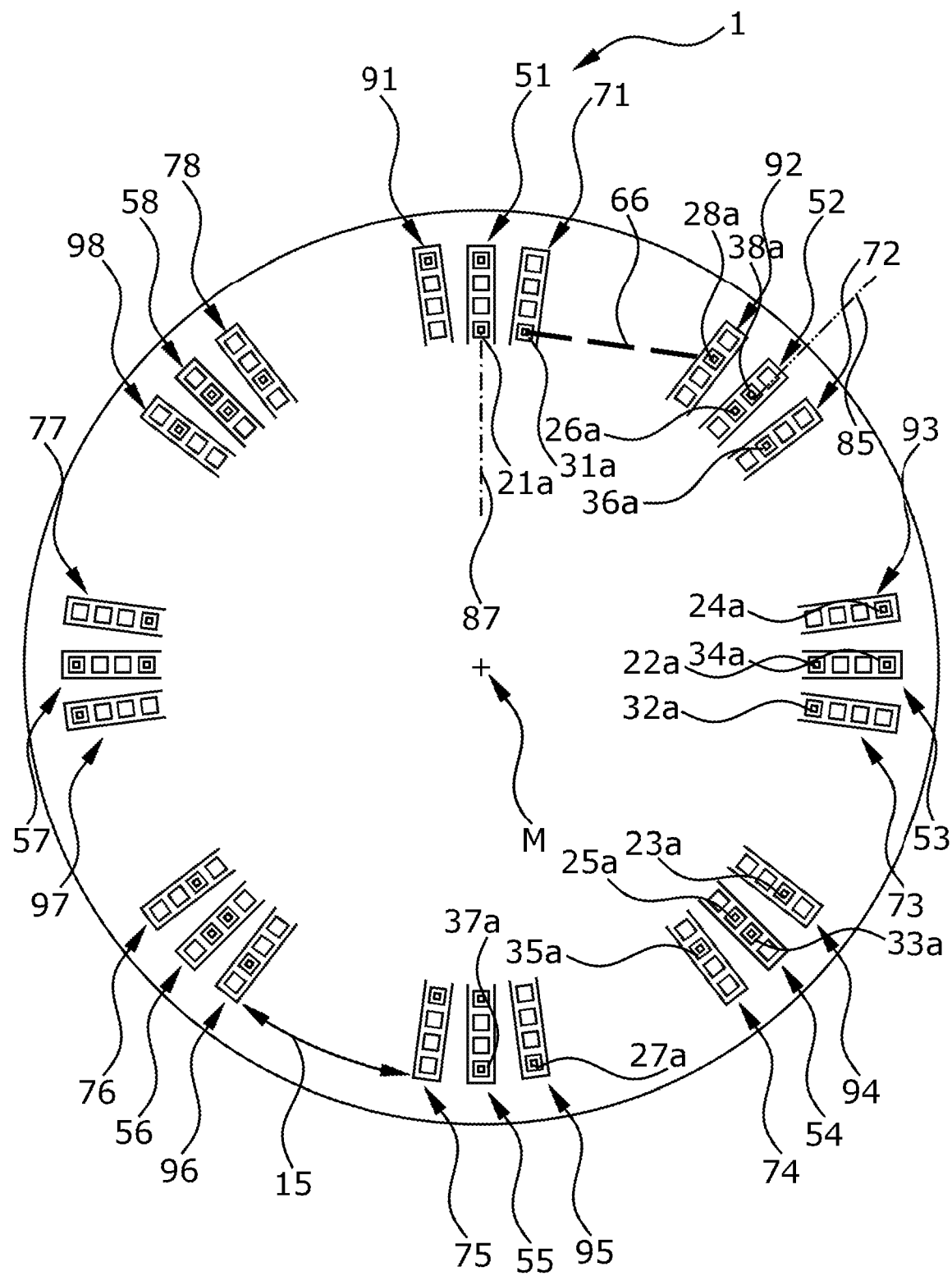
FIG. 8 shows a stator with a two other partial coils and their connection to one another and thus a second coil.

FIG. 8 shows a pin assignment by the first and second partial coils from FIGS. 6 and 7, which are depicted by black squares on a white background. Identical references numerals designate identical pins, slots, connections in the figures. Pin 28a of fourth winding 44 of the first partial coil in slot 92, layer L2, which is also a sixth end pin, and first pin 31a of fourth winding 48 of the second partial coil in slot 71, layer L4, which is also a seventh end pin, are connected by a sixth connection type 66.

The two partial coils thus form a second coil 202 with an input 87 and an output 85 after two radial circuits clockwise about the stator. A third distance 15, depicted in the figure, is two slots shorter than first distance 11 and one slot shorter than second distance 13 from the previous figures.

Figure 9:
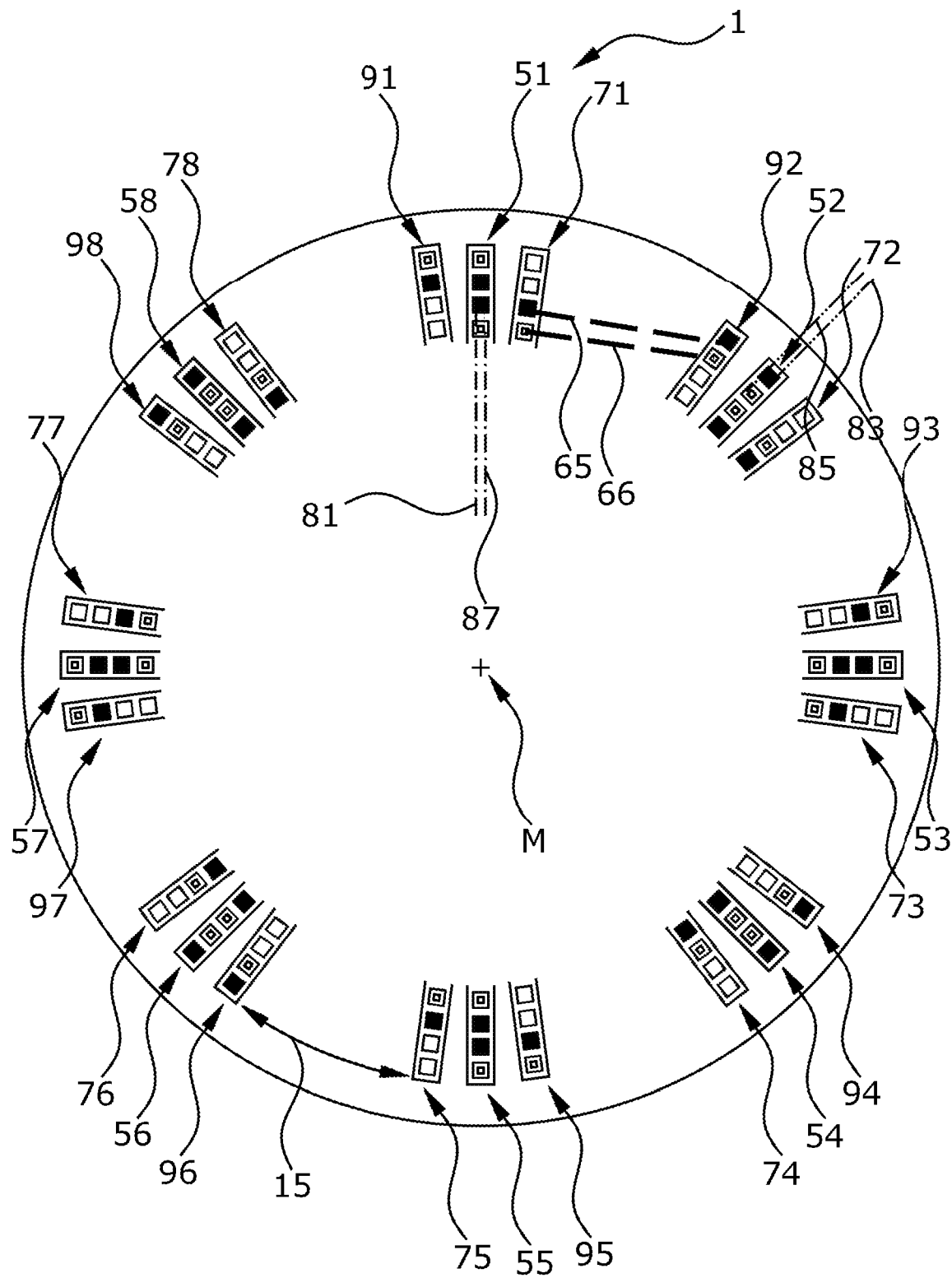
FIG. 9 shows a stator with two coils consisting of two partial coils respectively.

FIG. 9 shows a pin assignment by first coil 201 from FIG. 5, which is depicted by black squares. Identical references numerals designate identical pins, slots, connections in the figures. Furthermore, second coil 202 from FIG. 8 is depicted as black squares on a white background, which are located in the same slots but in different layers. The partial coils of the two coils are connected by fifth connection type 65 (first coil) or sixth connection type 66 (second coil). The two connection types 65, 66 are similar and differ only in their location in different layers.

Thus, two coils are shown, which each consist of two partial coils. Inputs and outputs of the coils are likewise shown. Input 81 of the first coil is located at slot 51 and output 83 at slot 52. Input 87 of the second coil is likewise located at slot 51 and output 85 at slot 52. The inputs and outputs of both coils thus lie in the respectively identical slot.

Figure 10:
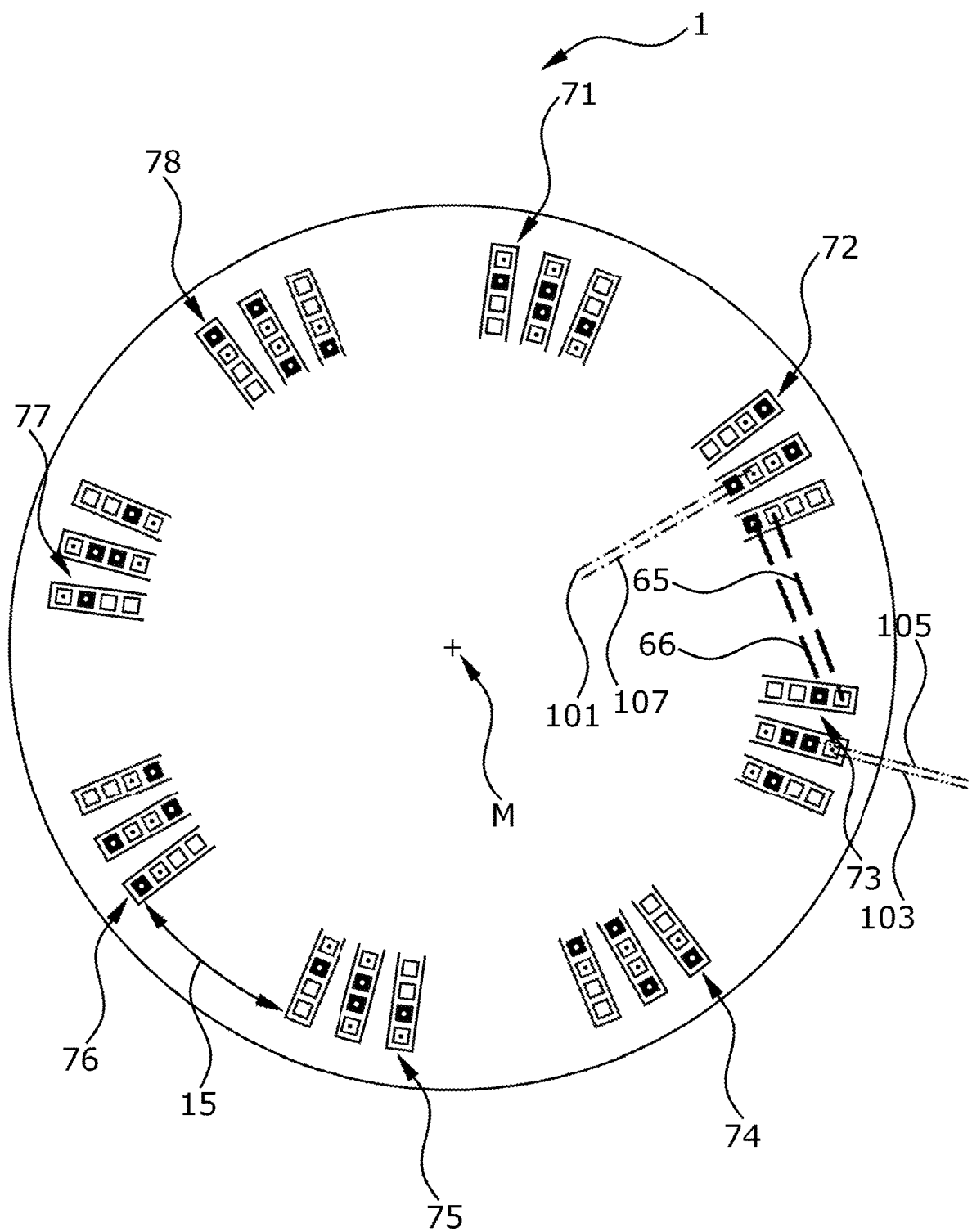
FIG. 10 shows a stator with two other coils.
Figure 11:
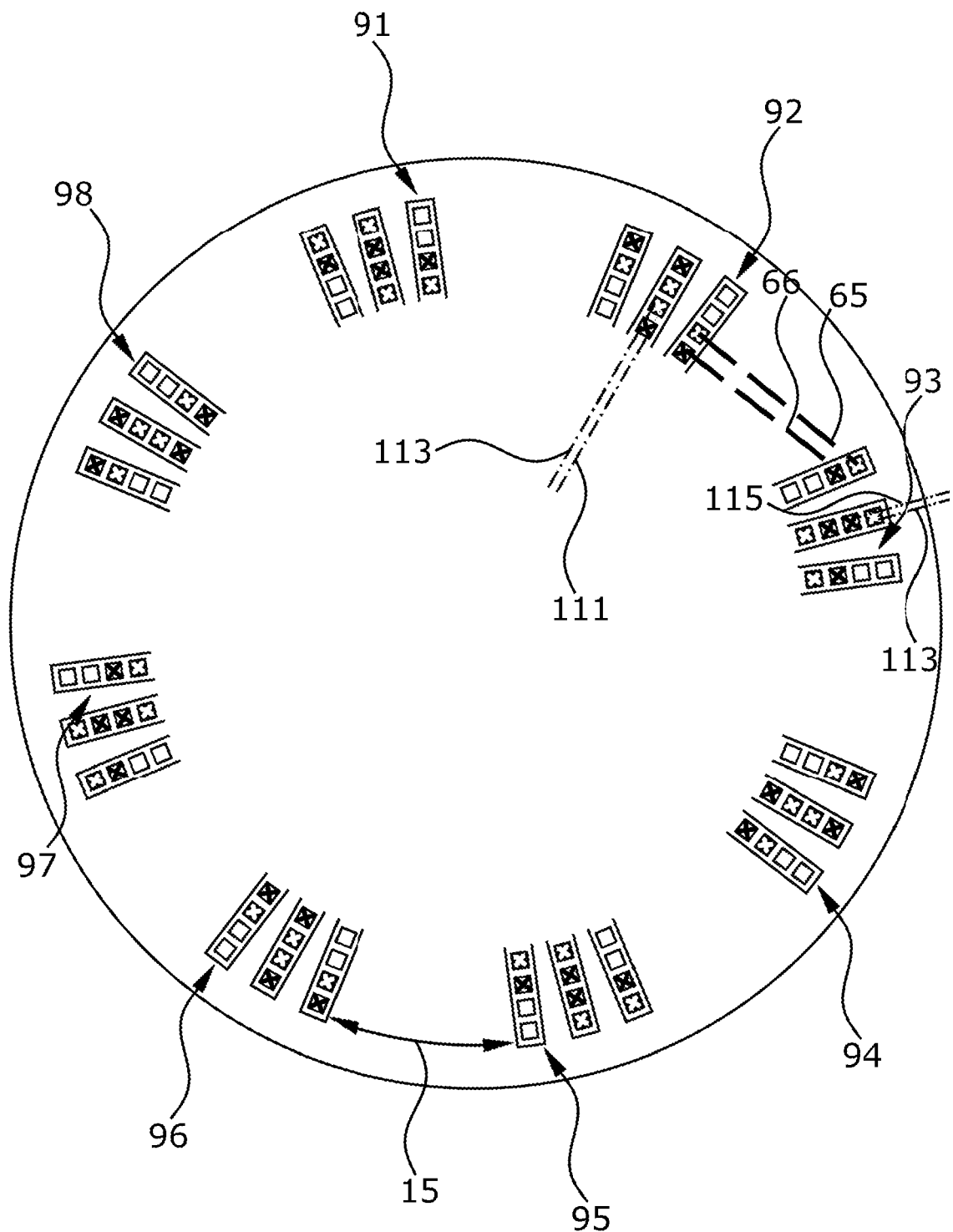
FIG. 11 shows a stator with two other coils.

FIG. 10 shows a pin assignment by a third and fourth coil in the black squares with white dots and the white squares with black dots. This results from a winding scheme, known from FIGS. 3, 4, 5, 6, 7, 8, which is offset clockwise by two slots in each case in comparison to the pins and connections of the partial coils shown there. Input 101 and output 103 of the third coil and input 107 and output 105 of the fourth coil are likewise shown. The inputs and outputs of both coils thus lie in the respectively identical slot. FIG. 11 shows a pin assignment depicted by a fifth and sixth coil, in the black squares with white crosses and the white squares with black crosses. This results from a winding scheme, known from FIGS. 3, 4, 5, 6, 7, which is offset clockwise by four slots in each case in comparison to the pins and connections of the partial coils shown there. Input 111 and output 113 of the third coil and input 117 and output 115 of the fourth coil are likewise shown. The inputs and outputs of both coils thus lie in the respectively identical slot.

Figure 12:
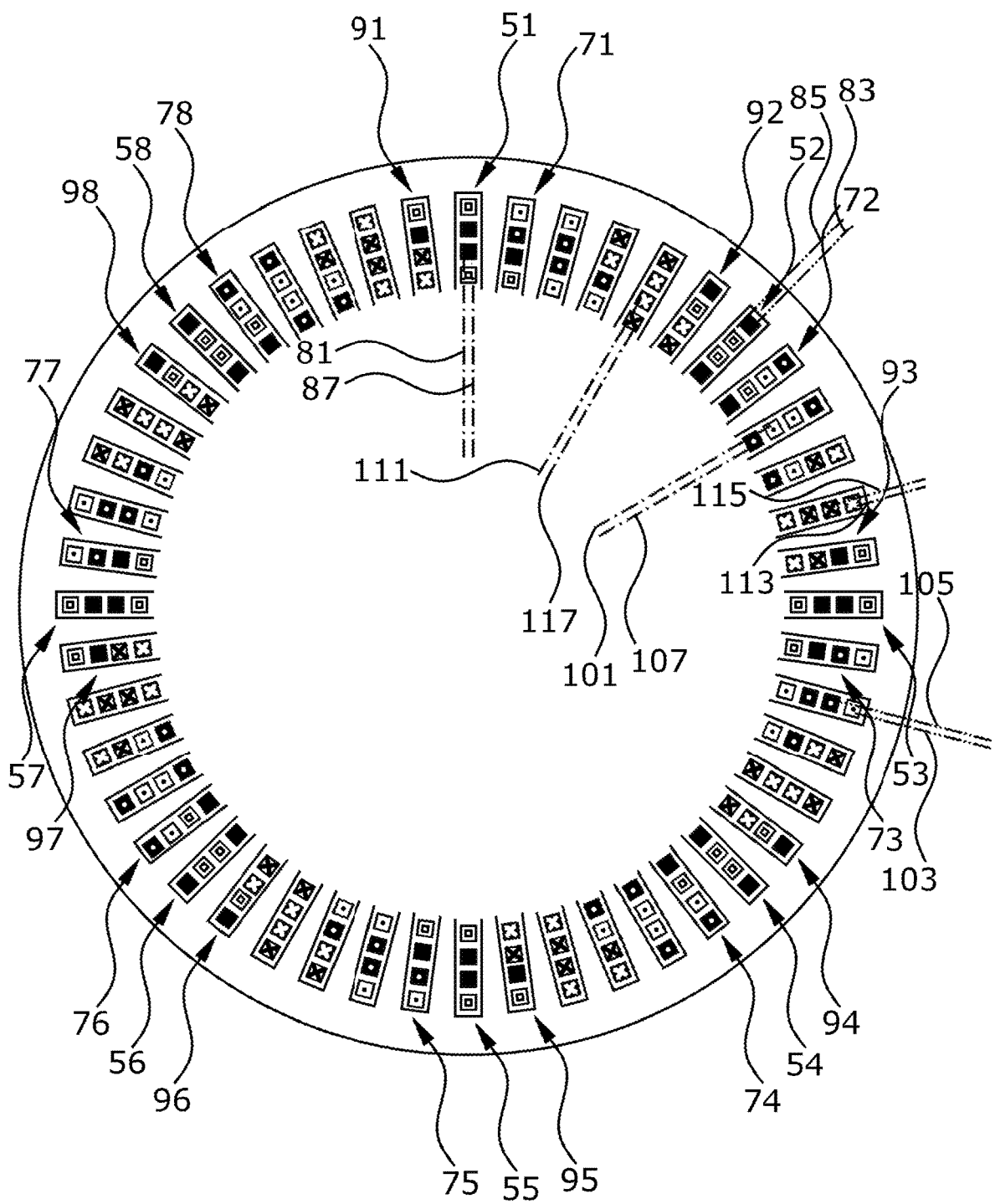
FIG. 12 shows a stator with six coils.

FIG. 12 shows a pin assignment by the six coils as a combination from FIGS. 9, 10, and 11. In particular, it is clear from the location of inputs 81, 87, 101, 107, 111, 117 and outputs 83, 85, 103, 105, 113, 115 that an interconnection of the coils may be carried out within 11 slots in each case. In the stator with forty eight slots, depicted by way of example, an interconnection of the inputs and outputs is thus possible within one third of the stator circumference. Based strictly on the inputs or outputs, a separated wiring would also be possible within five slots, if the slots and their inputs and outputs from FIG. 10 were rotated counter clockwise by 45 degrees. The exemplary embodiment shown in FIG. 12 leads to an interconnection of the inputs and outputs according to FIG. 1.

Figure 13:
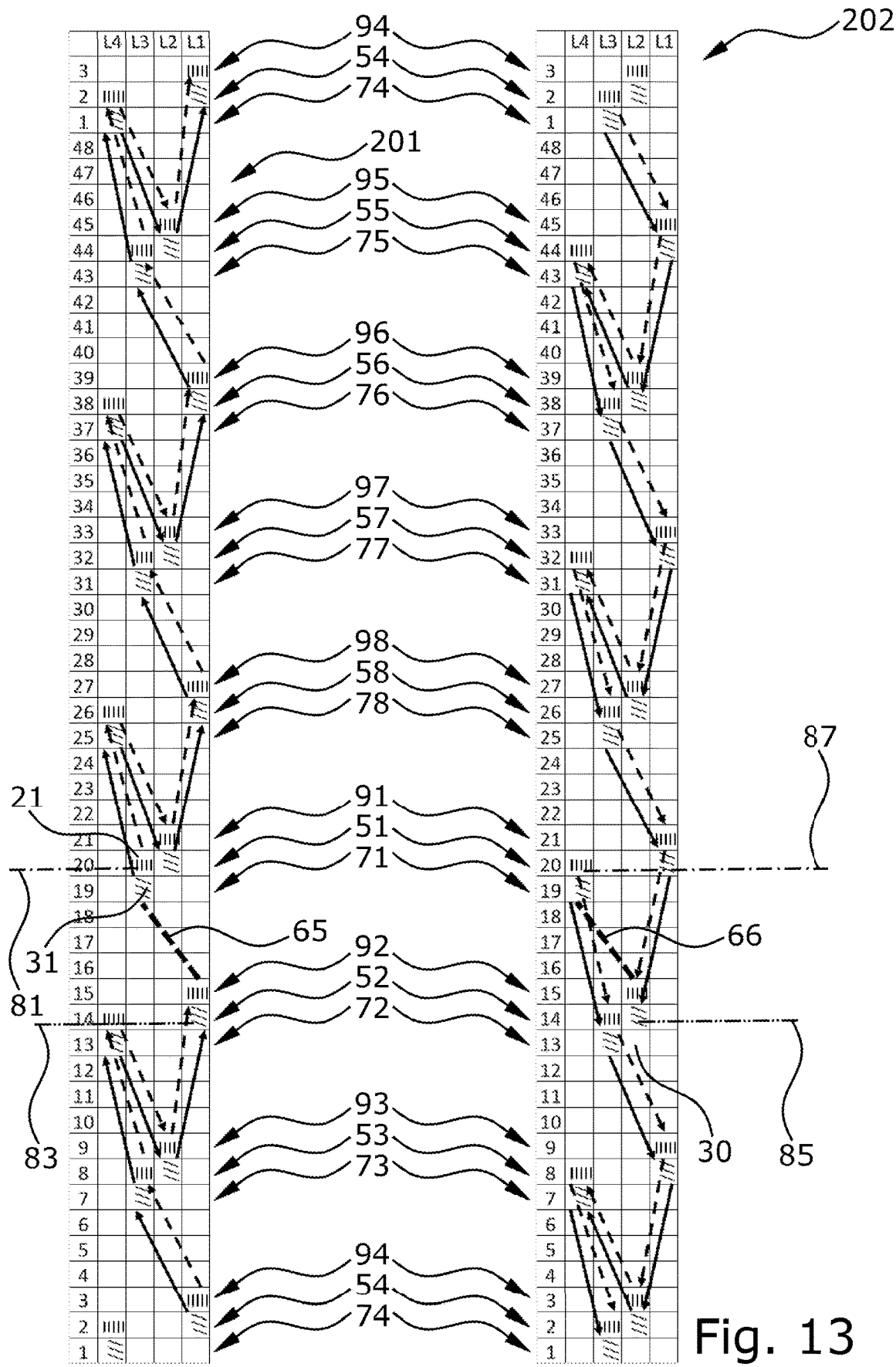
FIG. 13 shows a winding scheme of two coils.

FIG. 13 shows the winding scheme of two partial coils of first coil 201 and second coil 202 respectively. The consecutive "slot numbers" in the table are not reference numerals. The reference numerals with arrows to the slots are identical to the preceding figures and enable a comparison with these figures.

Figure 14:
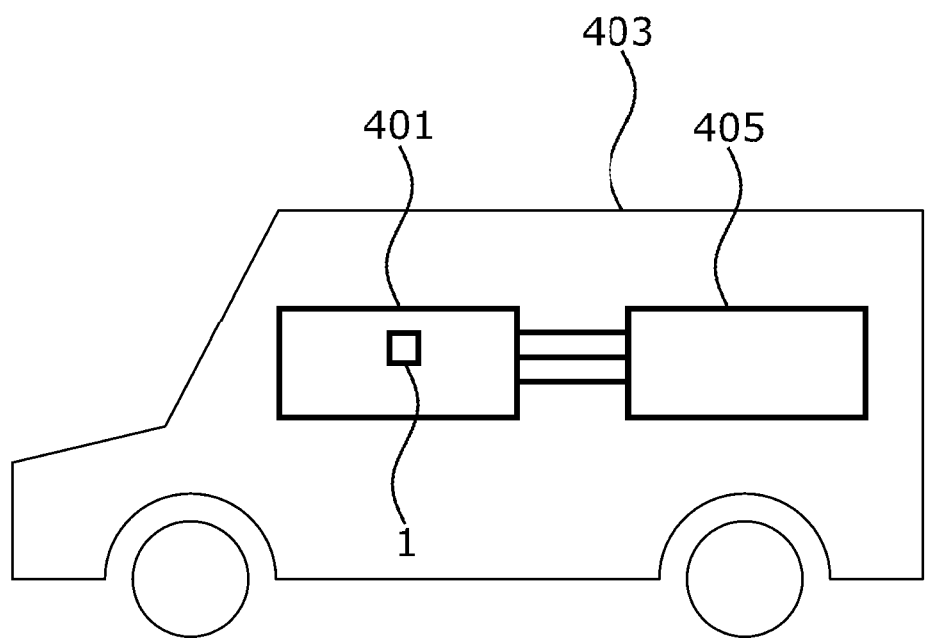
FIG. 14 shows a vehicle with an electric machine, in particular an electric motor, with a stator with an inverter.

FIG. 14 is a basic sketch of an exemplary embodiment of a vehicle 403, for example, a hybrid vehicle or an electric vehicle, comprising an electric machine 401, in particular an electric motor, with an exemplary embodiment of stator 1 for driving vehicle 403. Furthermore, vehicle 403 may have an inverter 405, which supplies electric machine 401 with an alternating current from a direct current source.

LIST OF REFERENCE NUMERALS

1 Stator
2, 3 Pin
7 First end face
9 Second end face
11 First distance
13 Second distance
15 Third distance
21 First end pin
28 Second end pin
31 Third end pin
38 Fourth end pin
21a First end pin
28a Second end pin
31a Third end pin
38a Fourth end pin
22-27, 22a-27a Pins
32-37, 32a-37a Pins
41-48 Winding
51-58 Slots
61 First connection type
62 Second connection type
63 Third connection type
64 Fourth connection type
65 Fifth connection type
66 Sixth connection type
71-78 Slots
81, 87, 101, 107, 111, 117 Input
83, 85, 103, 105, 113, 115 Output
91-98 Slots
201 First coil
202 Second coil
401 Electric machine
403 Vehicle
405 Inverter
L1, L2, L3, L4 Layer
M Stator center

The invention claimed is:

1. A stator (1) for an electric machine (100) comprising:
a plurality of pins (21, 22, 23, 24, 25), which are arranged on concentric circles at different distances to a stator center (M) in slots (51-58, 91-98) in the stator (1), and each concentric circle forms a layer (L1, L2, L3, L4),
wherein in each case four pins (21, 22, 23, 24, 25) in different layers (L1, L2, L3, L4) are serially connected to one another and form a winding (41),
a first pin (21) of the winding (41) is located in a first slot (51) in the 4n−1 layer (L3), wherein n is an integer,
a second pin (22) of the winding (41) is located in a second slot (58) in the 4n layer (L4), wherein the second slot (58) has a first radial distance (11) to the first slot (51) in a first circumferential direction of the stator (1),
a third pin (23) of the winding (41) is located in a third slot (91) in the 4n−2 layer (L2), wherein the third slot (91) lies adjacent to the first slot (51),
a fourth pin (24) of the winding (41) is located in a fourth slot (98) in the 4n−3 layer (L1), wherein the fourth slot (98) lies adjacent to the second slot (58).

2. The stator (1) according to claim 1, wherein the third and fourth slots (91, 98) preferably lie on a same adjacent side of the first and second slots (51, 58) in the circumferential direction.

3. The stator (1) according to claim 1, wherein
the first radial distance (11) lies between the first slot (51) and the second slot (58) and also between the third slot (91) and the fourth slot (98),
a second distance (13) lies between the third slot (91) and the second slot (58), wherein the second distance (13) is smaller than.

4. The stator (1) according to claim 1, wherein the stator (1) has a first end face (7) and a second end face (9); and
the first pin (21) and the second pin (22) are connected to one another on the second end face (9) by means of a first connection type (61);
the second pin (22) and the third pin (23) are connected to one another on the first end face (7) by means of a second connection type (62);
the third pin (23) and the fourth pin (24) are connected to one another on the second end face (9) by means of a third connection type (63);
wherein the first, second, and third connection types differ from one another.

5. The stator (1) according to claim 1, wherein the stator (1) has at least two windings (41, 42, 43) and at least the fourth pin (24) in the fourth slot (98, 96, 94) is connected to a fifth pin (25) in the 4n−1 layer (L3) in a fifth slot (57) by means of a fourth connection type (64).

6. The stator (1) according to claim 5, wherein the stator (1) has a plurality of windings (41, 42), which extend across the entire circumference of the stator (1) and thereby form a partial coil.

7. The stator (1) according to claim 6, wherein one pin (28, 31, 28a, 31a) in each case from two partial coils is connected to another by means of a fifth connection type (65) or a sixth connection type (66) and form a coil (201, 202).

8. The stator (1) according to claim 7, wherein the partial coils form six coils, and these are assigned to three phases in such a way that in each case two coils, which are assigned to a same phase, are located in three adjacent slots (51-58, 71-78, 91-98) and thereby in each case two layers of the two outer slots (71-78, 91-98) are occupied by pins from other phases.

9. The stator (1) according to claim 8, wherein one input (81, 101, 111, 87, 107, 117) from at least two coils (201, 202) are connected to one another by means of a seventh connection type.

10. The stator (1) according to claim 9, wherein in each case one output (83, 103, 113, 85, 105, 115) from at least two coils (201, 202) are connected to one another, and the two coils (201, 202) are thus switched in parallel, and, in particular, are assigned to one phase.

11. A vehicle (403) with an electric machine (401) with a stator (1) according to claim 1.

* * * * *